(No Model.)

W. H. R. TOYE.
PRINTING MACHINE.

No. 571,415.  Patented Nov. 17, 1896.

Witnesses.  Inventor.
William H. R. Toye
Attorney.

UNITED STATES PATENT OFFICE.

WILLIAM H. R. TOYE, OF PHILADELPHIA, PENNSYLVANIA, ASSIGNOR TO HIMSELF AND ROBERT P. BROWN AND EDWARD L. BAILEY, OF SAME PLACE.

PRINTING-MACHINE.

SPECIFICATION forming part of Letters Patent No. 571,415, dated November 17, 1896.

Application filed January 22, 1894. Serial No. 497,617. (No model.)

*To all whom it may concern:*

Be it known that I, WILLIAM H. R. TOYE, a citizen of the United States, residing in Philadelphia, in the county of Philadelphia, in the State of Pennsylvania, have invented a certain new and useful Improvement in Printing-Machines, of which the following is a true and exact description, reference being had to the accompanying drawings, which form a part thereof.

My invention relates to printing-presses, and has a special reference to color-printing presses, the object of my invention being to provide improved means for circumferentially and longitudinally adjusting the form-cylinder of a printing-couple with respect to the impression-cylinder, a prime object had in view being to provide adjusting mechanism which will permit the adjustment of the form-cylinder in both directions without necessarily requiring the stopping of the press.

The nature of my invention will be best understood as described in connection with the drawings in which they are illustrated, and in which—

Figure 1:
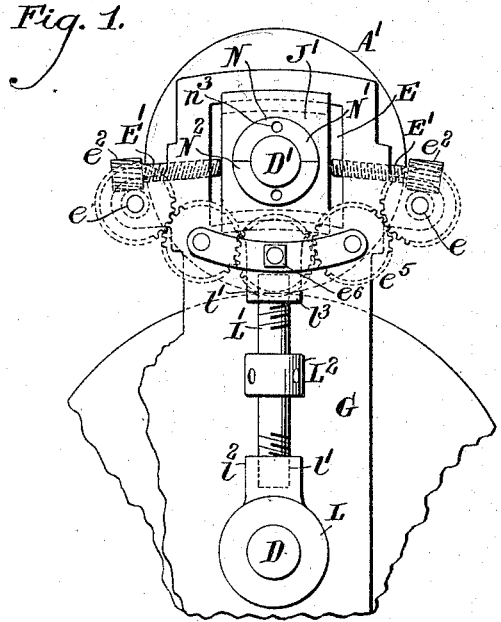
Figure 2:
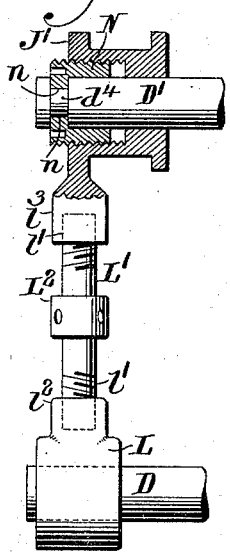
Figure 3:
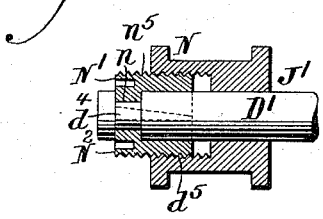
Figure 4:
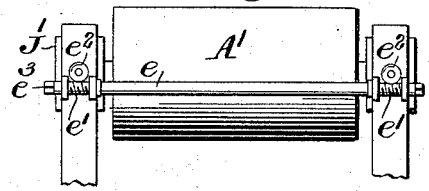

Figure 1 is an end view of a pair of cylinders provided with my improvements; Fig. 2, a side view, partly in section, of one end of the device shown in Fig. 1; Fig. 3, a more detailed view of a portion of the mechanism, and Fig. 4 a front view of the device shown in Fig. 1.

D is the shaft of the packing or impression cylinder, a fragment of which is shown in Fig. 1.

D' is the shaft of the form-cylinder A', this last-mentioned shaft having bearings in boxes J', which boxes are secured in grooves E formed in portions of the frame G, and the top and bottom of which grooves are preferably curved, as shown, each forming a circular arc turned from the center of the shaft D, and so that the box J' may move from side to side in the curve without departing from proper alinement with the impression-cylinder. In order to secure the box J' and the roll carried by it at a proper distance from the impression-cylinder and permit an adjustment of pressure between the rolls, I connect a threaded arm $l^3$ of the box with the threaded end $l^2$ of the hub L, journaled on the shaft D by means of a screw-bolt L' having right and left threads, as indicated at $l'$, and a device $L^2$ to permit the bolt to be turned in either direction. By turning this bolt the pressure of the form-cylinder upon the impression-cylinder can be nicely regulated.

In order to adjust the form-cylinder circumferentially with reference to the impression-cylinder, I secure the box J' in position in the groove E by means of two threaded bolts E' E', each passing through a threaded hole in the frame G and abutting against the respective sides of the box J'. By turning these bolts in opposite directions, and with the same speed, the box is adjusted circumferentially with reference to the impression-cylinder, and at the same time never permitted to have any lost motion. In order to insure the correct adjustment of the boxes at both ends of the roll and to permit the circumferential adjustment of the boxes without stopping the press, I provide each bolt E' with a worm-wheel $e^3$ at its end, which worm-wheels engage with worms on the ends of the transverse shafts $e\ e$, said shafts being connected by a train of gears, as indicated, and so that by turning either shaft $e$ the two bolts E' at each end of the roll are simultaneously caused to advance and recede, thus effecting the desired adjustment. It will be obvious, of course, that any convenient mechanical device for simultaneously shifting the bolts E', or their mechanical equivalents, could be substituted for the special mechanism above described.

In order to obtain a longitudinal adjustment of the form-cylinder, I form each box J' with its outer end provided with a screw-thread preferably upon an internal cavity, as $d^5$, at the end of the box, and I provide a sleeve preferably made of two parts N' and $N^2$, or, so to speak, split, and provided with a collar $n$, which fits in a groove $d^4$ at the ends of the shaft D'. By means of spanner-holes, as shown, or any convenient appliance for enabling a turning-tool to be used, the sleeves can be turned and the shaft longitudinally adjusted. Obviously one such sleeve can be used to effect this purpose, or, if desired, a sleeve may be used at each end of the shaft.

Having now described my invention, what I claim as new, and desire to secure by Letters Patent, is—

1. The combination with a pair of cylinders constituting a printing-couple, of journal-boxes in which the supporting-shaft of the form-cylinder turns, bolts adapted to engage with each side of both journal-boxes and retain them in position and means for operating all the bolts simultaneously and equally to adjust the cylinder as described.

2. The combination with two cylinders constituting a printing-couple of journal-boxes J' in which the supporting-shaft of the form-cylinder turns, said boxes having an internally-threaded outer end as $d^5$ and split sleeves N screwing on the ends of the boxes J' and connected with the roll-shaft so as to cause it to move longitudinally with them.

WILLIAM H. R. TOYE.

Witnesses:
CHARLES F. ZIEGLER,
EDWARD F. AYRES.